United States Patent [19]

Horiki et al.

[11] Patent Number: 4,913,786
[45] Date of Patent: Apr. 3, 1990

[54] METHOD OF CORROSION, SOUND, AND VIBRATION PROOFING OF A METAL STRUCTURE

[75] Inventors: Seinosuke Horiki; Reiji Makino, both of Tokai; Hisami Iwata, Toyota, all of Japan

[73] Assignees: Nagoya Oilchemical Co., Ltd.; Toyota Jidosha Kabushiki Kaisha, both of Aichi, Japan

[21] Appl. No.: 276,407

[22] Filed: Nov. 23, 1988

Related U.S. Application Data

[63] Continuation-in-part of Ser. No. 58,530, Jun. 5, 1987, abandoned.

[30] Foreign Application Priority Data

Jun. 9, 1986 [JP] Japan ............................ 61-132959

[51] Int. Cl.⁴ .................... C25D 5/48; B05D 1/32; B05D 5/00
[52] U.S. Cl. .................... 204/38.7; 427/264; 427/272
[58] Field of Search ............ 427/272, 282, 264, 118; 118/504, 505; 428/40, 317.1; 204/38.7

[56] References Cited

U.S. PATENT DOCUMENTS

3,667,988  6/1972  Horiki ............................ 427/282
4,346,782  8/1982  Böhm ............................ 181/207

Primary Examiner—Evan Lawrence
Attorney, Agent, or Firm—Cooper & Dunham

[57] ABSTRACT

A method of corrosion, sound and vibration-proofing of a metal structure which comprises masking a selected surface of said metal structure with a polystyrene foam masking member wherein said polystyrene foam has a closed cell structure and the density of said polystyrene foam is in the range of 12.5 to 50 g/l, coating the surfaces of said metal structure, including said masking member, with plasticized polyvinyl chloride by the spray coating and removing said masking member from the resulting polyvinyl chloride-coated metal structure by stripping off said masking member with a hook for removal from said polyvinyl chloride-coated metal structure, and said masking members are panel types for the even surfaces of said metal structure, block types with a slit for the panel like parts of said metal structure, tube types with a hole for the protruding parts of said metal structure, and plug types for the holes in said metal structure.

4 Claims, 13 Drawing Sheets

METHOD OF CORROSION, SOUND, AND VIBRATION PROOFING OF A METAL STRUCTURE This application is a continuation-in-part of application Ser. No. 058,530 filed June 5, 1987, now abandoned.

BACKGROUND OF THE INVENTION

The present invention relates to a method of corrosion, sound, and vibration-proofing of a metal structure such as for the underside of a car. More particularly, the present invention relates to a method corrosion, sound, and vibration-proofing of a metal structure comparising masking a selected surface of said metal structure by adhesively applying thereto a polystyrene foam masking member wherein polystyrene foam has a closed cell structure and a density in the range from about 12.5 to about 50 g/l, coating the surface of said metal structure including said masking member with plasticized polyvinyl chloride by spray coating and removing said masking member from the resulting polyvinyl chloride-coated metal structure by striking said spray coated masking member with a hook for removing said polyvinyl chloride-coated masking member from said metal structure and said polystyrene foam material is adhesively applied to said metal structure by a pressure sensitive adhesive.

Visco-elastic materials such as synthetic resin, rubber asphalt are coated on the surface of a metal structure such as the underside of a car by the spray coating for the purpose of corrosion, sound, and vibration proofing. Said coating layer of visco-elastic materials covers the surface of said metal structure to protect said surface from flying stones; it seals the joined parts of the surface from water and corrosion.

At the same time, said coating layer absorbs sound from the outside and vibration of the surface of said metal structure to exhibit a sound and vibration-proofing effect. Accordingly, said coating layer must be thick for a remarkable sound and vibration-proofing effect and usually the desirable thickness of said coating layer may be 500 to 200$\mu$. Therefore, said thick coating layer obstructs the firm attachment of parts such as bolts, nuts, brackets, frames and the like to the surface of said metal structure.

Further, said metal structure usually has many holes for cables, operation wires and the like, and for drainage and the like. In cases where said metal structure has holes, said visco-elastic material must be prevented from going into said holes when said visco-elastic material is coated on the surface of said metal structure. Especially in a car, said visco-elastic material must be prevented from going into the holes that are in the outer panel which would give a bad appearance.

Nevertheless, since said visco-elastic material is coated on the surface of said metal structure by the spray coating, the local coating of the surface of said metal structure is very difficult.

Therefore, it is necessary to protect such parts of said metal structure by masking members and then coat the surface of said metal structure with said visco-elastic material by the spray coating. After coating, said masking members may be removed from said surface of said metal structure.

DESCRIPTION OF THE PRIOR ART

Hitherto, the adhesive tape has been used as a masking member to protect a part of a metal structure from the spray coating of said visco-elastic material. Namely, adhesive tape is attached to a part of a metal structure to protect it from said spray coating and, after the coating, said adhesive tape is removed from the part of said metal structure. Said part is not coated with said visco-elastic material since said part was covered with adhesive tape during surface treatment.

Said adhesive tape as a masking member has faults. In cases where the part to be protected from the coating is wide, it is troublesome to attach adhesive tape to the part to be protected and remove said adhesive tape from said part since a number of strips of adhesive tape must be attached to said part to cover the whole part, and further, in a case where the part to be protected from the coating is protruding, it is also troublesome to wind adhesive tape over and over again around the part to be protected and remove said adhesive tape from said part.

Still further, adhesive tape attached to the part to be protected is buried in the coating layer and it is very difficult to find said buried adhesive tape and, of course, it is very difficult to remove said buried adhesive tape.

Still further, it is very difficult to cover only the necessary parts of a metal structure by adhesive tape resulting in that parts which are not covered with the visco-elastic layer may remain.

Said difficulty of attaching and removing of the masking member to/from the part to be protected may be very serious problem particularly for the continuous spray-coating of the visco-elastic material in the corrosion, sound, and vibration-proof treatment in the mass-production system such as the car industry, the electric industry, and the like.

SUMMARY OF THE INVENTION

Accordingly, an object of the present invention is to save trouble when the masking member is attached/removed to/from said part to be protected.

According to the present invention there is provided a method of corrosion, sound, and vibration-proofing of a metal structure comprising masking a selected surface of said metal structure by adhesively applying thereto a polystyrene foam masking member wherein polystyrene foam has a closed cell structure and a density in the range from about 12.5 to about 50 g/l, coating the surface of said metal structure including said masking member with plasticized polyvinyl chloride by spray coating and removing said masking member from the resulting polyvinyl chloride-coated metal structure by striking said spray coated masking member with a hook for removing said polyvinyl chloride-coated masking member from said metal structure.

Before masking the metal structure, it may be subjected to treatment consisting of cleaning, electrodeposition of a coating thereon and an anticorrosion coating.

For the even surfaces of said metal structures, panel-types may be used as the masking member, for the panel-like parts of said metal structure, block types with a slit may be used as the masking member, for protruding parts of said metal structure, tube types with a hole may be used as the masking member, and for the holes in said metal structure, plug types may be used as the masking member.

Since said polystyrene foam having a closed cell structure is very brittle, the hook is very easy to stick into the masking member when said masking member is removed from the metal structure by stripping off said masking member with the hook. Nevertheless, if the density of said polystyrene foam is less than 12.5 g/l, the masking member may be easily broken during such as transportation, storage, and the like and if the density of said polystyrene foam is more than 50 g/l, it may be difficult to stick the hook into the masking member.

BRIEF DESCRIPTIONS OF THE DRAWINGS

DETAILED DESCRIPTION

Figure 1:
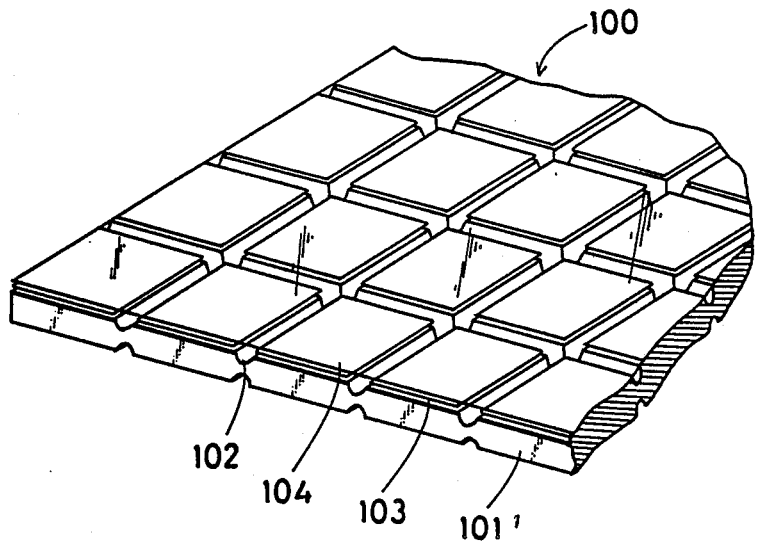
FIG. 1 is a partial perspective view of a first embodiment of the present invention.
Figure 2:
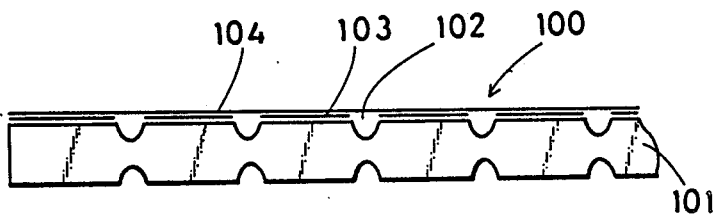
FIG. 2 is a partial side sectional view of the first embodiment of the present invention.

FIG. 1 to FIG. 4 relate to the first embodiment of the present invention.

Referring now to FIG. 1 to FIG. 4, a masking member (100) comprises a panel (101) consisting of a polystyrene foam, wherein said polystyrene foam has a closed cell structure and the density of said polystyrene foam is in the range of 12.5 to 50 g/l. Check-like grooves (102) are formed at regular intervals on both sides of said panel (101), and an adhesive layer (103) is formed on a side of said panel (101). Said adhesive layer (103) is covered with a release sheet (104) such as a polyethylene film, a polypropylene film, a release paper, and the like to prevent sticking to another article, the hands of workers, and the like when the masking members are handled; one placed upon another, transported, and the like. Said panel (101) of the masking member (100) may be produced by expansion molding, cutting out from blocks of a polystyrene foam and the grooves of the masking members of the present invention may include cutting lines. Said grooves may be formed when the panel is molded or by cutting after the panel is molded or cut out.

Said panel may be colored by a suitable color for the purpose of selection of the specified masking member according to the part to be protected. Further, the colored masking member may be easily found when said masking member is removed after coating.

Figure 3:
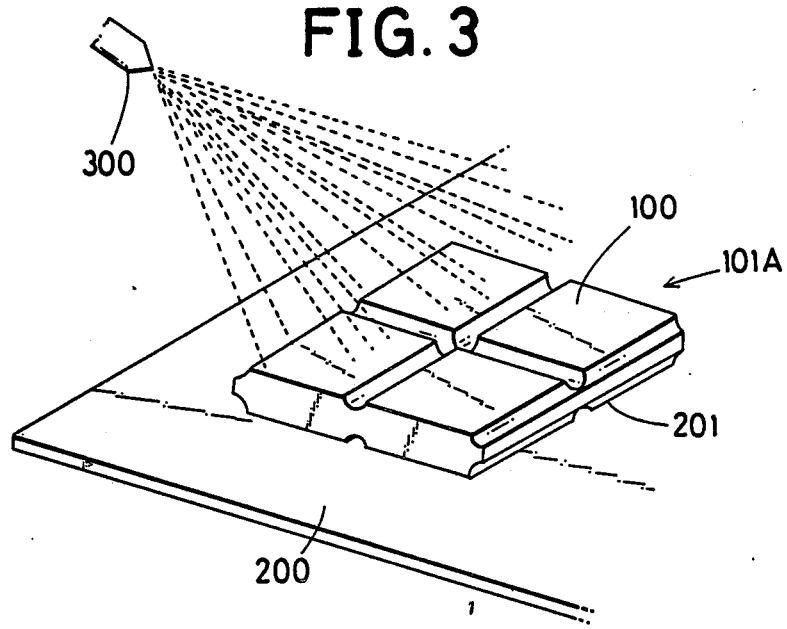
FIG. 3 is a partial perspective view of the first embodiment of the present invention in the case of coating.

When the masking member (100) is used, the release sheet (104) is removed from the adhesive layer (103) and the panel (101) is snapped long the grooves by hand into a piece (101A) having the proper size corresponding with a part (201) of metal structure (200) which is necessary to be protected from a coating of visco-elastic material. The resulting piece (101A) is then attached to said part (201) of said metal structure (200) by said adhesive layer (103) thereof as shown in FIG. 3.

Figure 4:
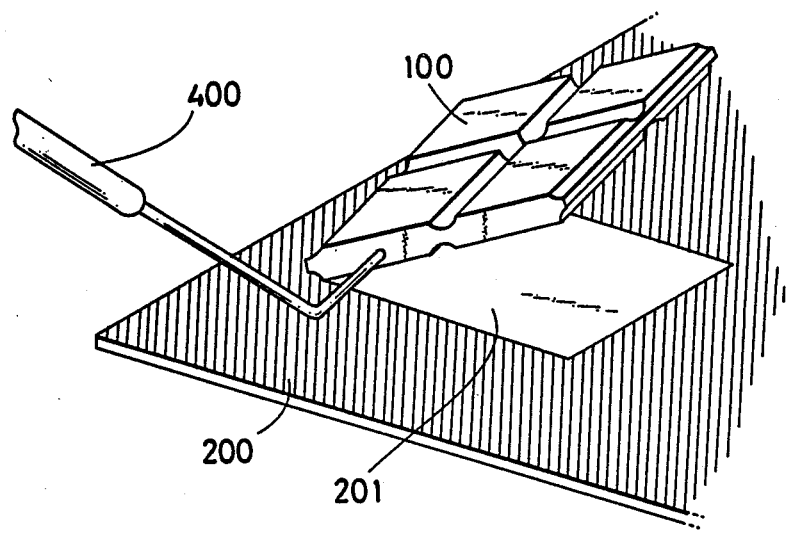
FIG. 4 is a partial perspective view of the first embodiment of the present invention in the case of removing the masking member from the metal structure.

In the case of coating, a liquid form of the visco-elastic material is sprayed from a spray gun (300) onto the surface of said metal structure (200). The part (201) of said metal structure (200) is not subjected to said coating since said part (201) is covered by piece (101A) of the masking member (100). After coating, said coated metal structure (200) is heated to dry it and/or cure it if desired. After or before said heating, said piece (101A) is stripped off by a hook (400) as shown in FIG. 4.

The visco-elastic material used in the present invention may be plastic, rubber, asphalt, pitch and the like, and a solution, emulsion, dispersion, liquid prepolymer of said visco-elastic material or molten visco-elastic material may be used in the case of coating. Said liquid of the visco-elastic material may be such as polyvinyl chloride paste, polyvinyl chloride sol, an organic solution of polyacrylate, an organic solution of styrene-butadiene rubber, polyvinyl acetate emulsion, polyacrylate emulsion, styrene-butadiene rubber latex, an emulsion of ethylenevinyl acetate copolymer, polyurethane emulsion, asphalt emulsion, petroleum resin emulsion, polyethylene emulsion, molten ethylene-vinyl acetate copolymer, molten asphalt, molten pertroleum resin, molten polyethylene, urethane prepolymer, unsaturated polyester resin and the like. Two or more kinds of said visco-elastic materials may be mixed together in the present invention.

Figure 5:
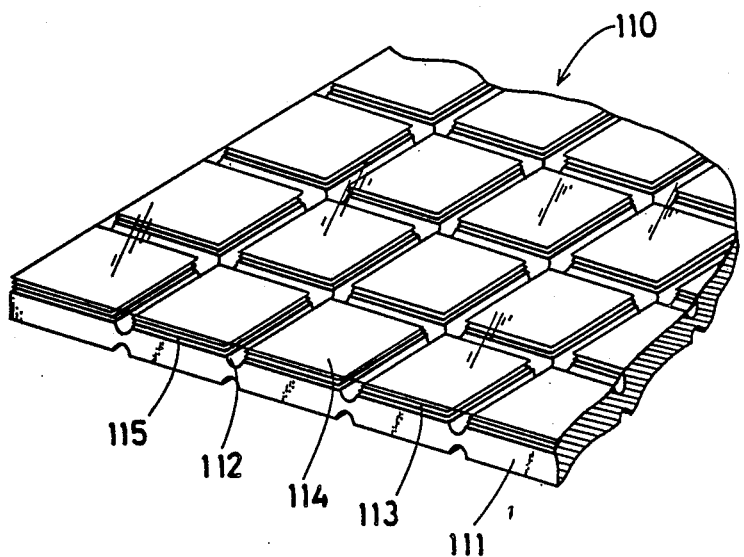
FIG. 5 is a partial perspective view of a second embodiment of the present invention.
Figure 6:
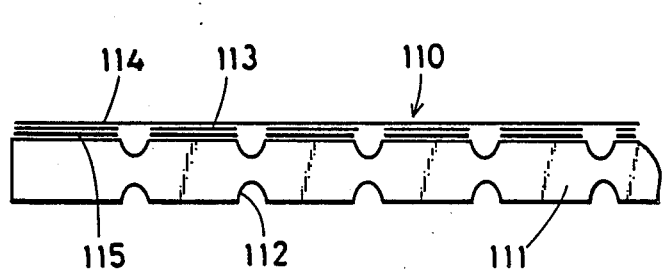
FIG. 6 is a partial side sectional view of the second embodiment of the present invention.

FIG. 5 and FIG. 6 relate to the second embodiment of the present invention.

Referring now to FIG. 5 and FIG. 6, a masking member (110) comprises a panel (111) consisting of a polystyrene foam, the same as the first embodiment and grooves (112), the same as the first embodiment, are formed on both sides of said panel (111). A primer layer (115) is formed on a side of said panel (111) and an adhesive layer (113) is formed on said primer layer (115). Said adhesive layer (113) is covered with a release sheet (114), the same as the first embodiment. Said primer layer (115) prevents said adhesive layer (113) soaking into said panel (111) since said panel (111) consists of the polystyrene foam and the surface of said panel (111) is porous, and said primer layer (115) is formed by laminating the film of a plastic such as, polyethylene, polypropylene, Vinyl-acetate-ethylene copolymer, polyvinylchloride and the like by heating or adhesive, or by coating with an emulsion or a solution of a synthetic resin such as acrylic resin, polyvinyl acetate resin, polyethylene, polypropylene, vinyl acetate-ethylene copolymer and the like on a side of said panel (111). Further, the skin layer formed on the surface of said panel (111) in cases where said panel (111) is produced by expansion molding, may also be used as said primer layer (115).

Said panel may be colored by a suitable color for the purpose of selection of the specified masking member according to the part to be protected. Further, the colored masking member may be easily found when said masking member is removed after coating.

FIG. 7 to FIG. 10 relate to the third embodiment of the present invention.

Figure 7:
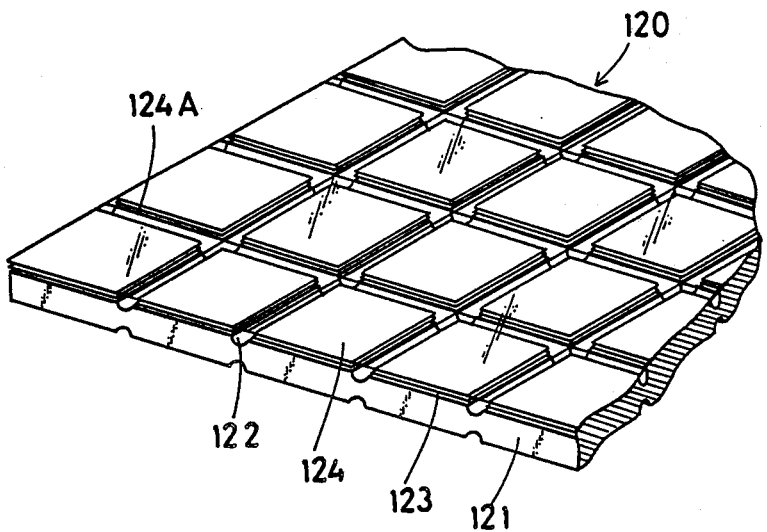
FIG. 7 is a partial perspective view of a third embodiment of the present invention.
Figure 8:
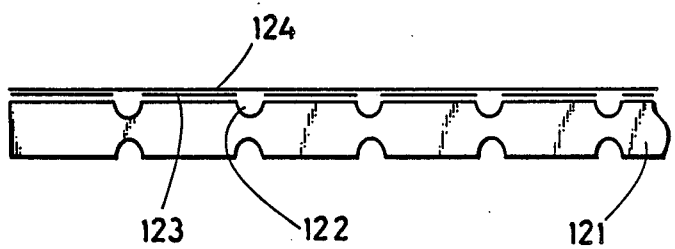
FIG. 8 is a partial side sectional view of the third embodiment of the present invention.

Referring now to FIG. 7 and FIG. 8, a masking member (120) comprises a panel (121) consisting of a polystyrene foam, the same as the first and second embodiments and grooves (122), the same as the first and second embodiments, are formed on both sides of said panel (121). An adhesive layer (123) is formed on a side of said panel (121) and said adhesive layer (123) is covered with a release sheet (124). Cutting lines (124A) along the grooves (122) of said panel (121) are formed on said release sheet (124).

Said panel may be colored by a suitable color for the purpose of selection of the specified masking member according to the part to be protected. Further, the colored masking member may be easily found when said masking member is removed after coating.

Figure 9:
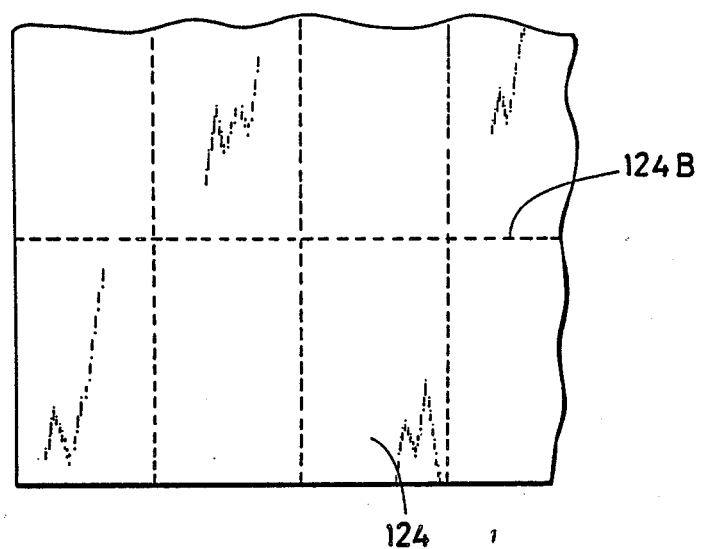
FIG. 9 is a plane view of another embodiment of the release sheet having cutting lines.
Figure 10:
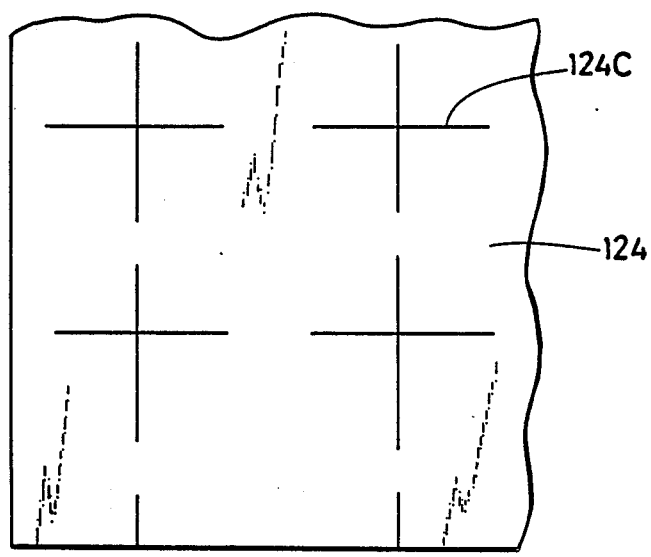
FIG. 10 is a plane view of a further embodiment of the release sheet having cutting lines.

When said masking member (120) is used, said panel (121) ia snapped along said grooves (122) by hand into a piece (121A) having a size corresponding with a part of metal structure and, at the same time, said release sheet (124) is easily snapped along said cutting lines (124A). Said cutting lines may include perforated lines (124B) as shown in FIG. 9 and discontinuous lines (124C) as shown in FIG. 10.

Figure 11:
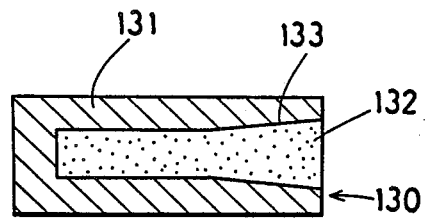
FIG. 11 is a cross-sectional view of a fourth embodiment of the present invention.
Figure 12:
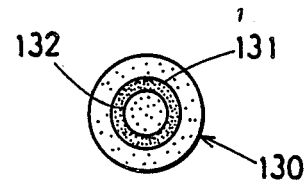
FIG. 12 is a front view of the fourth embodiment of the present invention.
Figure 13:
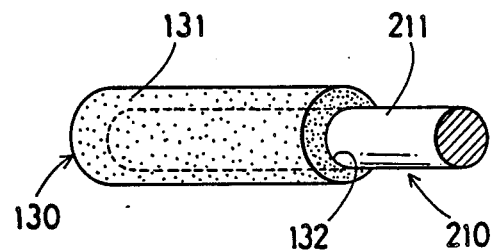
FIG. 13 is a partial perspective view of the fourth embodiment of the present invention in the case of masking.

FIG. 11 to FIG. 13 relate to the fourth embodiment of the present invention.

Reffering now to FIG. 11 and FIG. 12, a masking member (130) comprises a tube (131) consisting of a polystyrene foam, the same as the first, second and third embodiments and said masking member (130) has a blind hole (132). Said blind hole (132) has a tatering part (133) increasing gradually in its diameter to the entrance of said hole (132).

Said tube (131) may be colored by a suitable color for the purpose of selection of the specified masking member according to the part to be protected. Further, the colored masking member may be easily found when said masking member is removed after coating.

Figure 14:
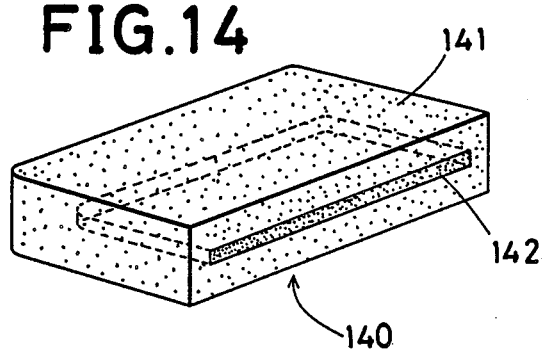
FIG. 14 is a perspective view of a fifth embodiment of the present invention.

Said masking member (130) is attached to a protruding part (211) of a metal structure (210) which is necessary to be protected from coating, by inserting said protruding part (211) into said blind hole (132) of said masking member (130) as shown in FIG. 14. After said masking member (130) is attached to said protruding part (211), said liquid of visco-elastic material is spray-coated onto the surface of said metal structure (210). Said protruding part (211) of said metal structure (210) is not subjected to said coating since said protruding part (211) is covered with said masking member (130). After coating, said coated metal structure (210) is heated to dry it and/or cure it if desired. After or before said heating, said masking member (130) is removed from said protruding part (211) by the hook. Further, said protruding part (211) is easily inserted into said hole (132) of said masking member (130) and said masking member (130) is firmly attached to said protruding part (211) by its elasticity since the said hole (132) of said masking member (130) has a tapering part (133) increasing gradually in its diameter to the entrance of said hole (132).

Figure 15:
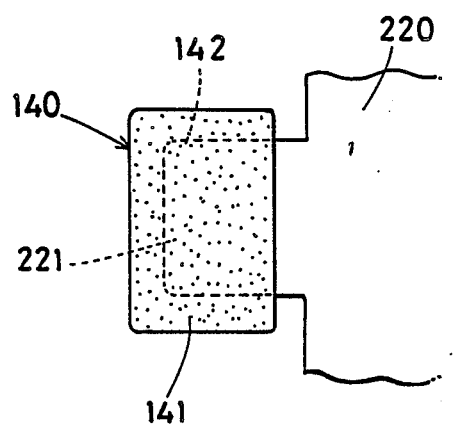
FIG. 15 is a partial perspective view of the fifth embodiment of the present invention in the case of masking.
Figure 16:
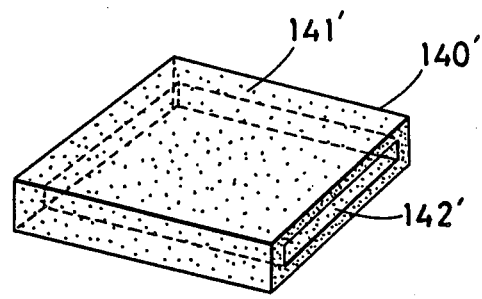
FIG. 16 is a perspective view of a masking member having an open slit in the fifth embodiment of the present invention.

FIG. 14 to FIG. 16 relate to the fifth embodiment of the present invention.

Referring now to FIG. 14 and FIG. 15, a masking member (140) comprises a block (141) consisting of a polystyrene foam, the same as the first, second, third, and fourth embodiments and said block (141) has a blind slit (142).

Said block (141) may be colored by a suitable color for the purpose of selection of the specified masking member according to the part to be protected. Further, the colored masking member may be easily found when said masking member is removed after coating.

Said masking member (140) is attached to an panel-like part (221) of a metal structure (220) which is necessary to be protected from coating, by inserting said extending part (221) into said blind slit (142) of said masking member (140) as shown in FIG. 15.

As shown in FIG. 16, said block (141') of said masking member (140') may have an open slit (142').

Figure 17:
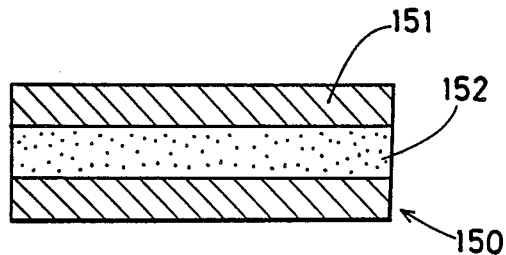
FIG. 17 is a side sectional view of a sixth embodiment of the present invention.
Figure 18:
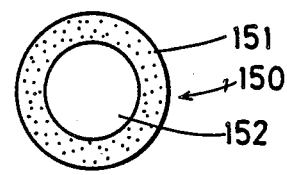
FIG. 18 is a front view of the sixth embodiment of the present invention.
Figure 19:
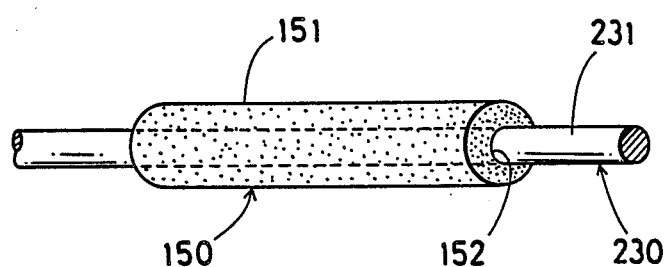
FIG. 19 is a partial perspective view of the sixth embodiment of the present invention in the case of masking.

FIG. 17 to FIG. 19 relate to the sixth embodiment of the present invention.

Referring now to FIG. 17 to FIG. 19, a masking member (150)comprises a tube (151) consisting of a polystyrene foam, the same as the first, second, third, fourth and fifth embodiments, and said masking member (150) has an open hole (152).

Said tube (151) may be colored by a suitable color for the purpose of selection of the specified masking member according to the part to be protected. Further, the colored masking member may be easily found when said masking member is removed after coating.

Said masking member (150) is attached to a protruding part (231) of a metal structure (230) which is necessary to be protected from coating, by allowing said protruding part (231) to enter said open hole (152) of said masking member (150) as shown in FIG. 19. After said masking member (150) is attached to said protruding part (231), said liquid of the visco-elastic material is spray-coated on the surface of said metal structure (230). Said protruding part (231) of said metal structure (230) is not subjected to said coating since said protruding part (231) is covered by said masking member (150). The center of said open hole (152) of said masking member (150) may have a smaller diameter than the both ends of said open hole (152). In this case, said masking member (150) is firmly attached to said protruding part (231) by its elasticity.

Figure 20:
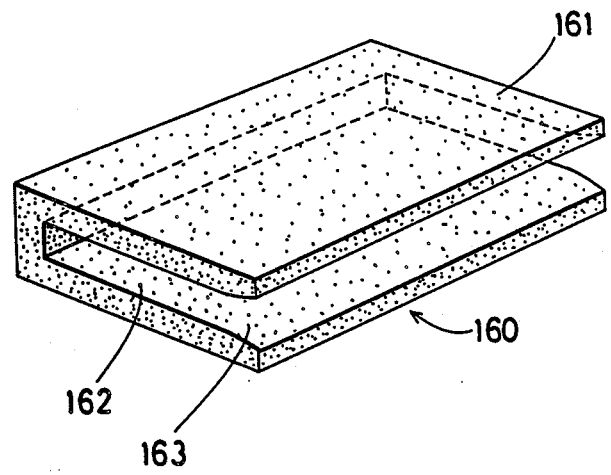
FIG. 20 is a perspective view of a seventh embodiment of the present invention.
Figure 21:
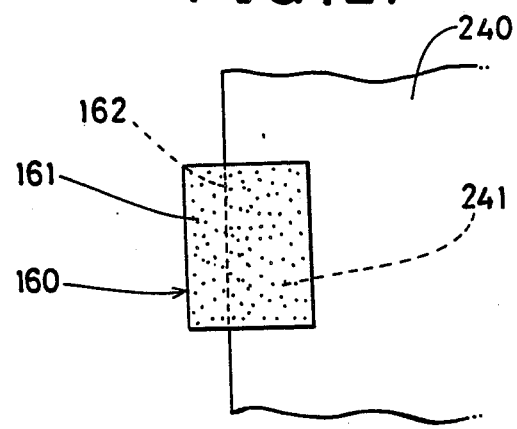
FIG. 21 is a partial perspective view of the seventh embodiment of the instant invention.

FIG. 20 and FIG. 21 relate to the seventh embodiment of the present invention.

Referring now to FIG. 20 and FIG. 21, a masking member (160) comprises a block (161) consisting of a polystyrene foam, the same as the first, second, third, fourth, fifth and sixth embodiment and said block (161) has a slit (162) both sides of which are opened. Said slit (162) has a tapering part (163) increasing gradually in its width to the entrance of said slit (162).

Said block (161) may be colored by a suitable color for the purpose of selection of the specified masking member according to the part to be protected. Further, the colored masking member may be easily found when said masking member is removed after coating.

Said masking member (160) is attached to a panel part (241) of a metal structure (240) which is necessary to be protected from coating, by inserting said panel part (241) into said slit (162) of said masking member (160) as shown in FIG. 21. Further, said panel part (241) of said metal structure (240) is easily inserted into said slit (162) of said masking member (160) and said masking member (160) is firmly attached to said panel part (241) by its elasticity.

Figure 22:
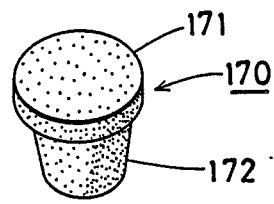
FIG. 22 is a perspective view of an eighth embodiment of the present invention.
Figure 23:
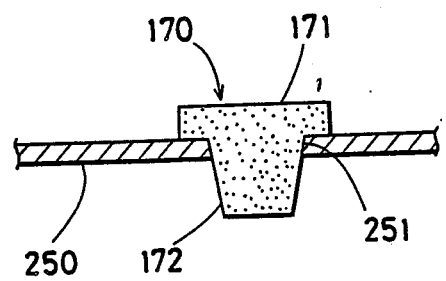
FIG. 23 is a cross-sectional view of the eighth embodiment of the present invention in the case of masking.

FIG. 22 and FIG. 23 relate to the eighth embodiment of the present invention.

Referring now to FIG. 22 and FIG. 23, a masking member (170) has a plug-form comprising a head (171) and an inserting part (172) and said inserting part (172) has a tapering form increasing gradually in its diameter to said head (171). Said masking member (170) consists of a polystyrene foam, the same as the first, second, third, fourth, fifth, sixth and seventh embodiments, and said masking member (170) may be colored by a suitable color for the purpose of selection of the specified masking member according to the part to be protected. Further, the colored masking member may be easily found when said masking member is removed after coating.

Said masking member (170) is attached to a hole (251) in a metal structure (250) by inserting the inserting part (172) of said masking member (170) into said hole (251) and the inside of said hole (251) is covered by said inserting part (172) of said masking member (170) and the circumference of said hole (251) is covered by said head (171) of said member (170) to protect the inside of said hole (251) and the circumference of said hole (251) from said coating. It may be very easy to insert said masking member (170) into said hole (251) since the inserting part of said masking member (170) has a tapering form increasing gradually in its diameter to said head (171) and said masking member (170) may be firmly attached to said hole (251) by its elasticity.

Figure 24:
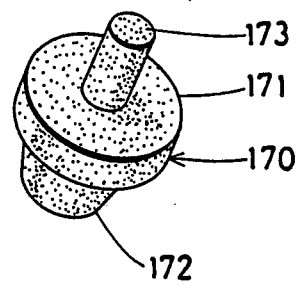
FIG. 24 is a perspective view of a masking member having a pull as part of the eighth embodiment of the present invention.

As shown in FIG. 24, a grip (173) may be formed on the head (171) of said masking member (170).

Coloring of said masking member may not always be necessary in the present invention.

Figure 25:
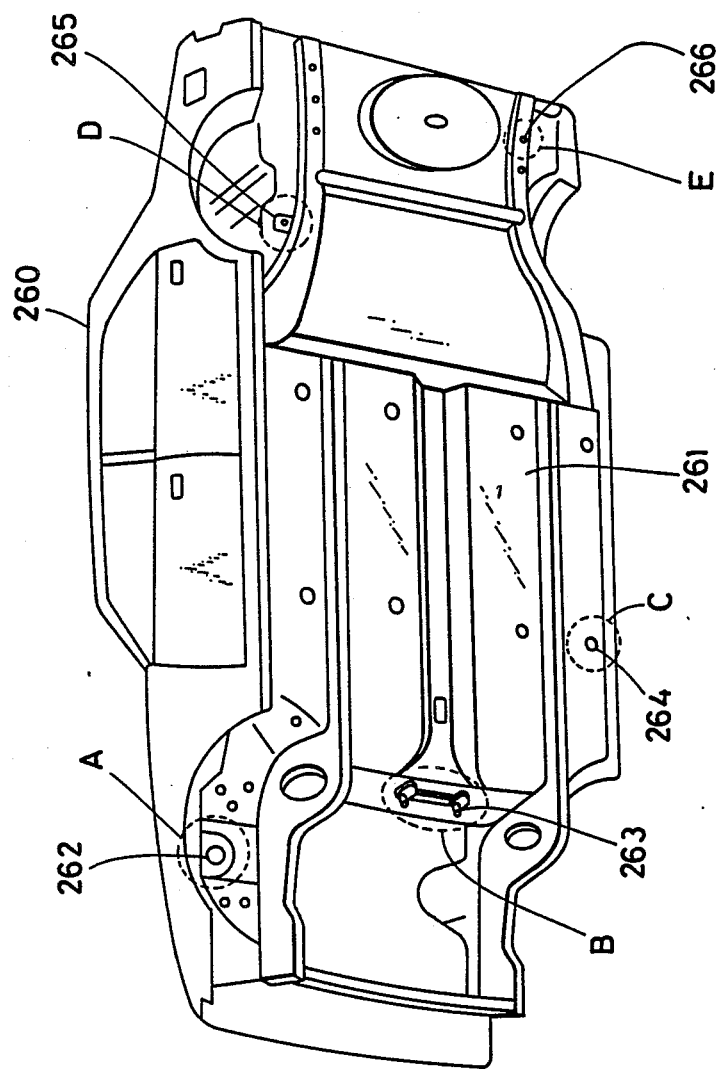
FIG. 25 is a perspective view of a car body of a practical example of the present invention.

FIG. 25 to FIG. 30 show an applied embodiment in which the present invention is applied to the underside of the floor of cars. As shown in FIG. 25, the masking members of the present invention are attached to parts A, B, C, D and E of the underside (261) of the floor of a car (260).

Figure 26:
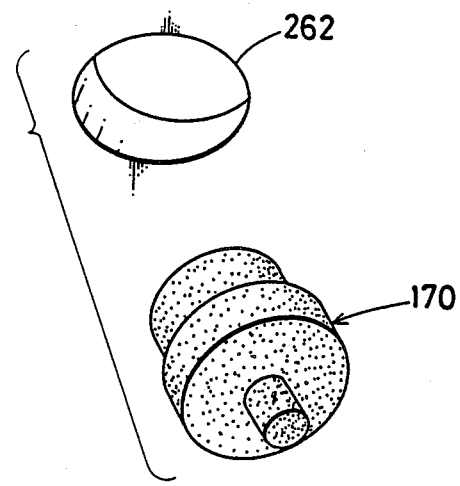
FIG. 26 is a perspective view of Part A of the practical example.

Namely, as shown in FIG. 26 said masking member (171) of FIG. 24 of the eighth embodiment may be attached to a hole (262) of part A into which a spring axis of a forward wheel is inserted and the circumference of the hole (262) is used as a bed for the spring. Therefore, the inside of the hole (262) is covered with the inserting part (172) of the masking member (170) and the circumference of the hole (262) is covered with the head (171) of the masking member (170) to protect these from the spray coating of visco-elastic material.

Figure 27:
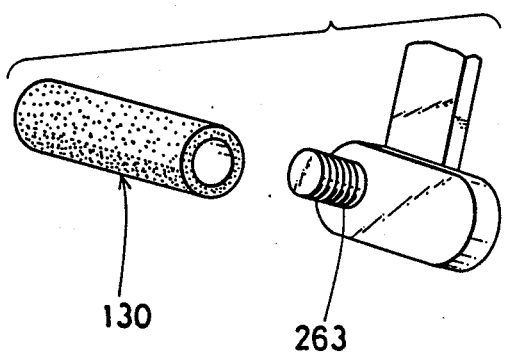
FIG. 27 is a perspective view of Part B of the practical example.

As shown in FIG. 27, the masking member (130) of the fourth embodiment is attached to a bolt (263) of part B which is used to attach a part to the underside (261) of the floor of a car (260).

Figure 28:
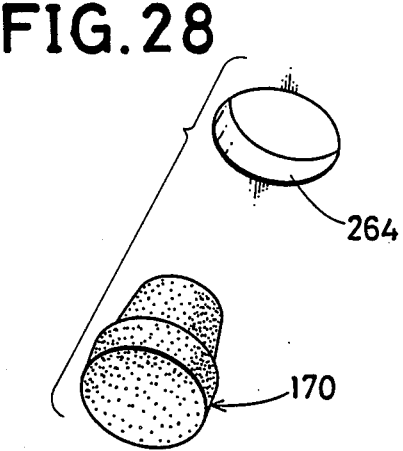
FIG. 28 is a perspective view of Part C of the practical example.
Figure 29:
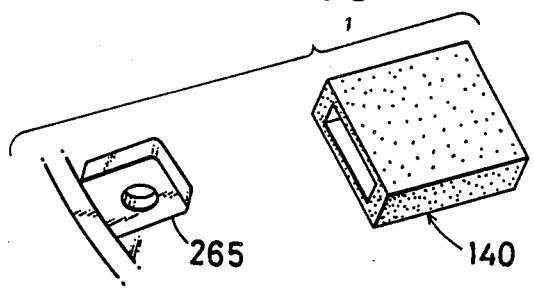
FIG. 29 is a perspective view of Part D of the practical example.
Figure 30:
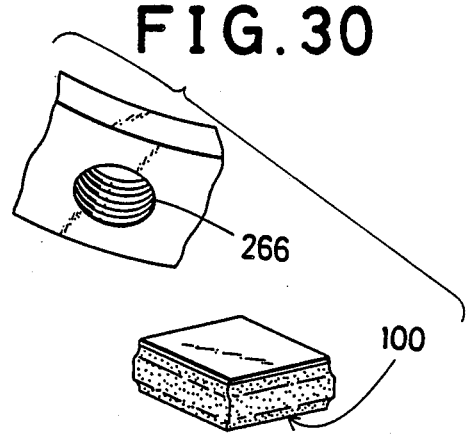
FIG. 30 is a perspective view of Part E of the practical example.

As shown in FIG. 28, the masking member (170) of the eighth embodiment is inserted into a drainage hole (264),-as shown in FIG. 29, the masking member (140) of the fifth embodiment is attached to a bracket (265) of part D which is used to attach a part to the underside (261) of the floor of a car (260), and as shown in FIG. 30, the masking member (100) of the first embodiment is attached to a screw hole (266) which is used to attach a part to the underside (261) of the floor of the car.

Thus, said hole (262), said bolt (263), said drainage hole (264), said bracket (265) and said screw hole (266) are protected by said masking members of the present invention from the spray coating of visco-elastic material.

We claim:

1. A method of corrosion, sound and vibration-proofing of a metal structure which comprises masking a selected surface of said metal structure by adhesively applying thereto a polystyrene foam, adhesive coated panel masking member wherein the polystyrene foam has a closed cell structure and a density in the range from about 12.5 to about 50 g/l, coating the surface of said metal structure including said masking member with plasticized polyvinyl chloride by spray coating and removing said masking member from the resulting polyvinyl chloride-coated metal structure by striking said spray coated masking member with a hook for penetrating and for removing said polyvinyl chloride-coated masking member from said metal structure.

2. A method in accordance with claim 1 wherein said polystyrene foam material is adhesively applied to said metal structure by a pressure sensitive adhesive.

3. A method in accordance with claim 1 wherein said metal structure before masking is subjected to treatment consisting of cleaning, electrodeposition of a coating thereon and an anti-corrosion coating.

4. A method in accordance with claim 1 wherein said metal structure is the underside of a motor vehicle or car.

* * * * *